Sept. 12, 1967      G. C. HOUSWORTH      3,341,170
VALVE
Filed March 25, 1964      5 Sheets-Sheet 3
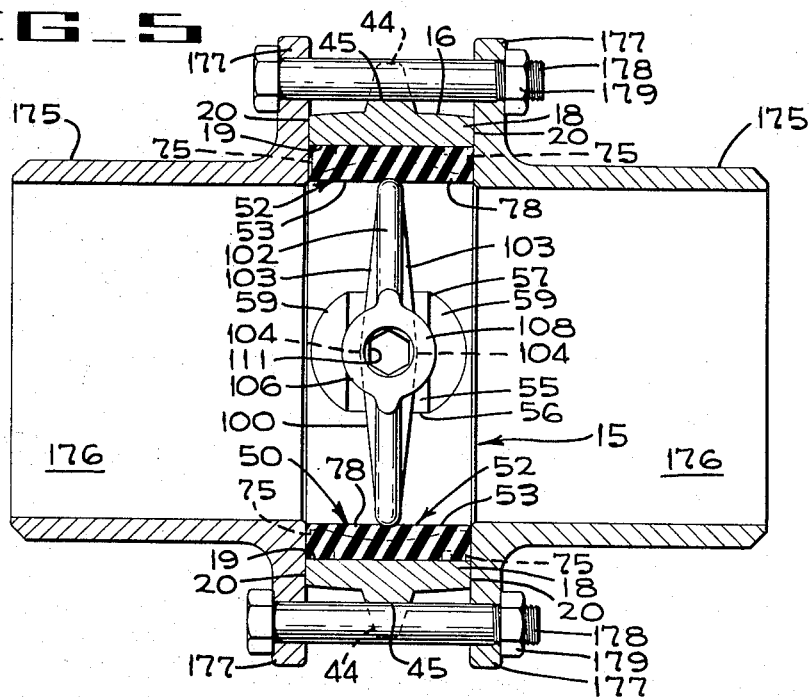
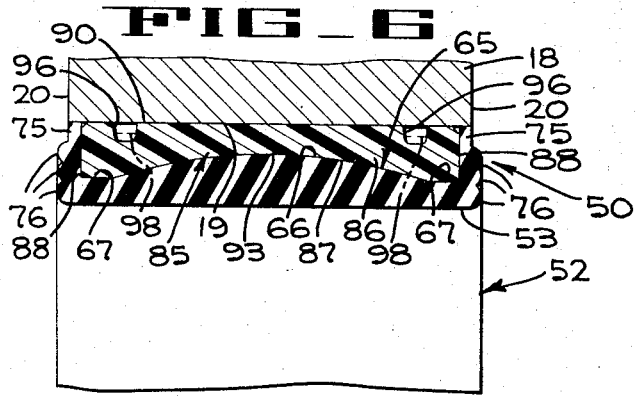
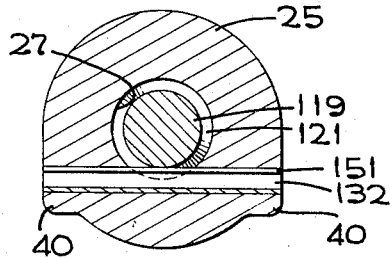
INVENTOR
GORDON C. HOUSWORTH
BY Hans G. Hoffmeister
ATTORNEY Sept. 12, 1967     G. C. HOUSWORTH     3,341,170
VALVE
Filed March 25, 1964     5 Sheets-Sheet 4
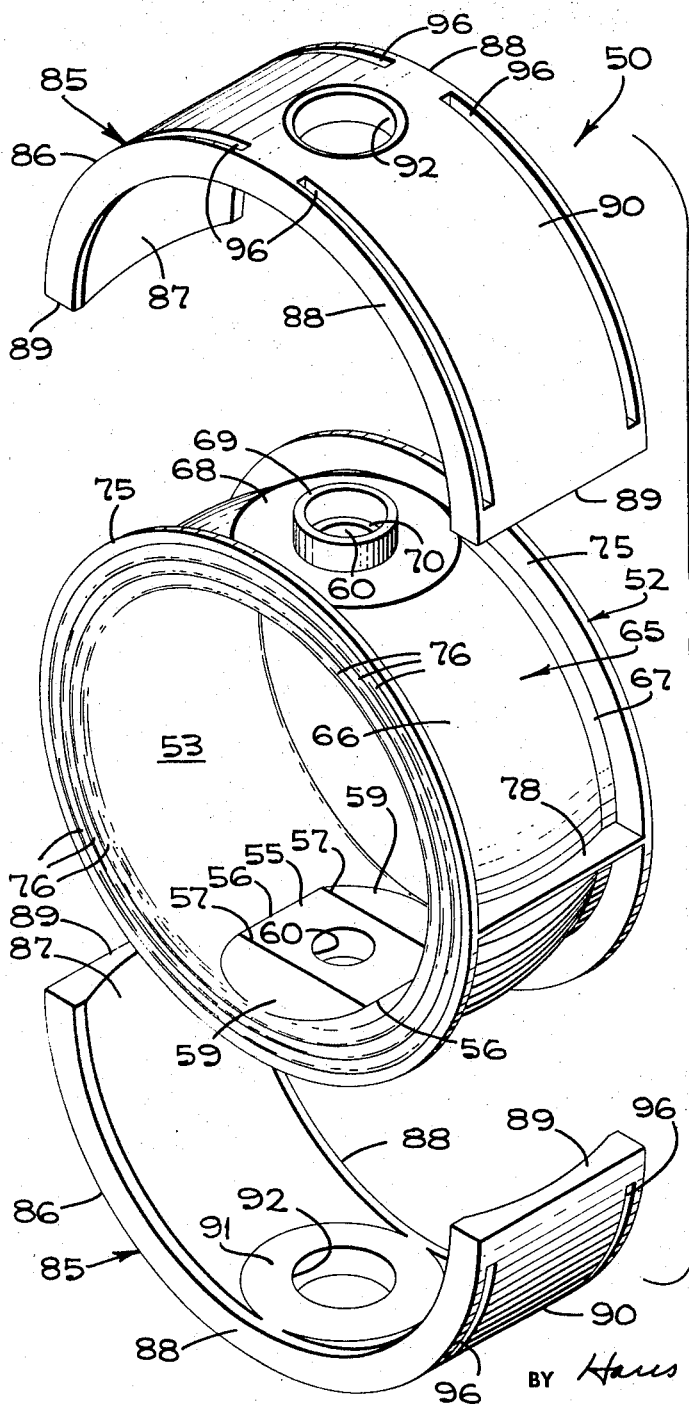
FIG_8
INVENTOR
GORDON C. HOUSWORTH
BY Hans G. Hoffmeister
ATTORNEY

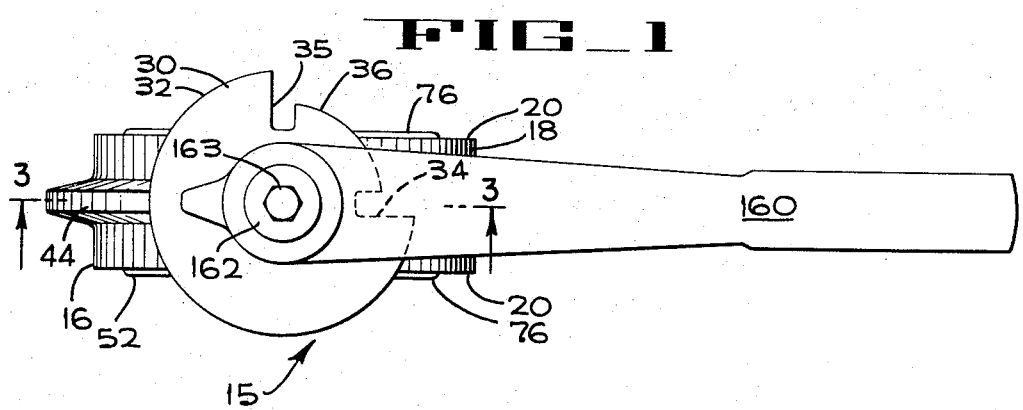
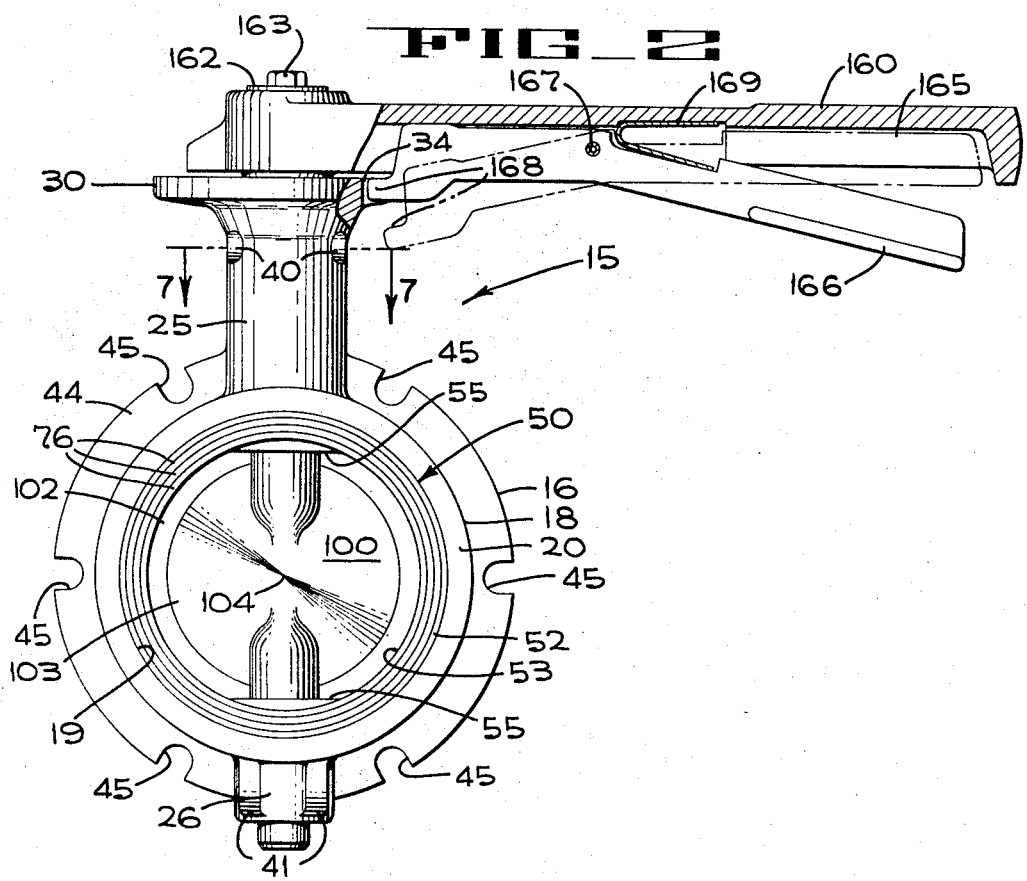

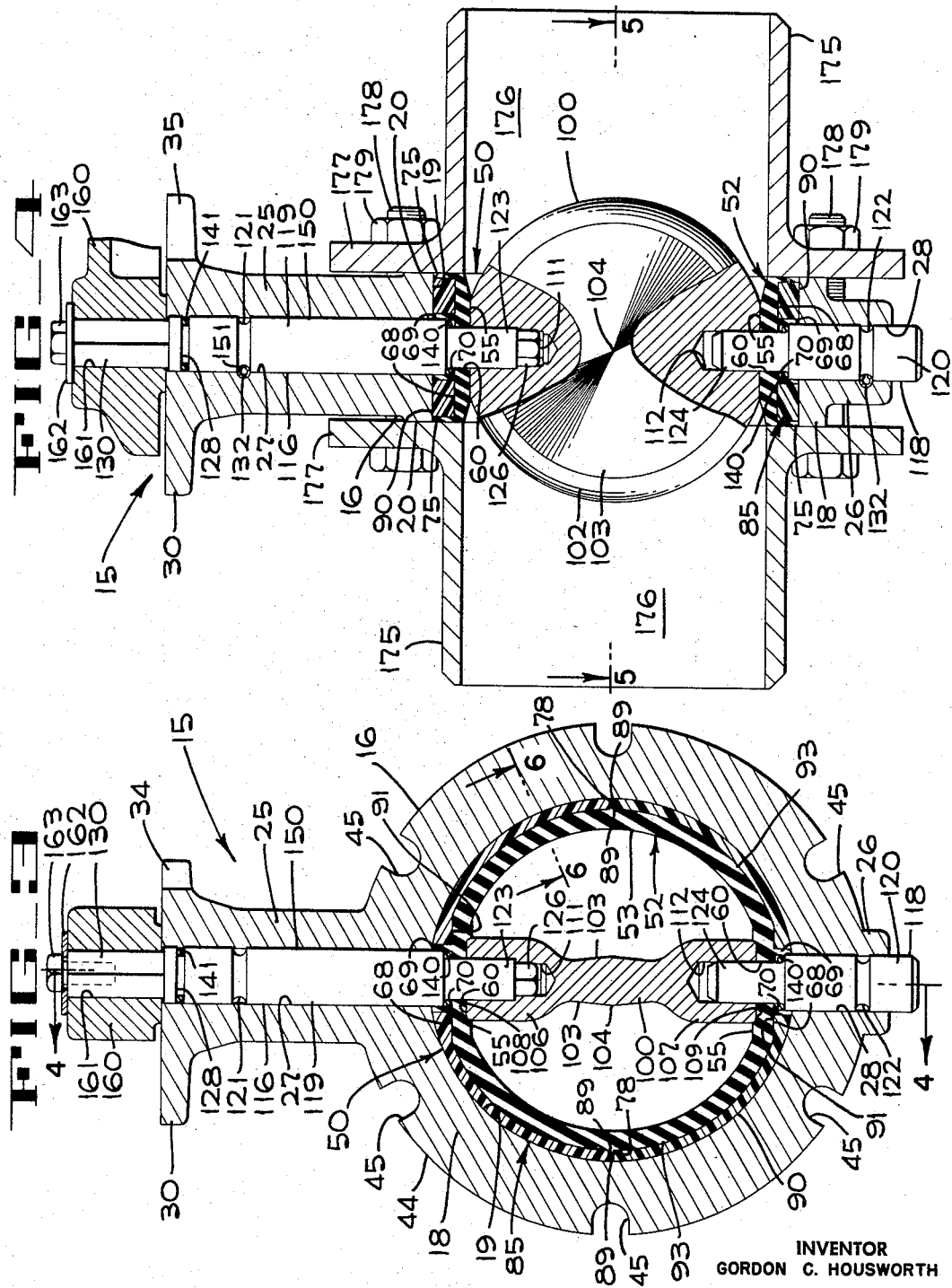

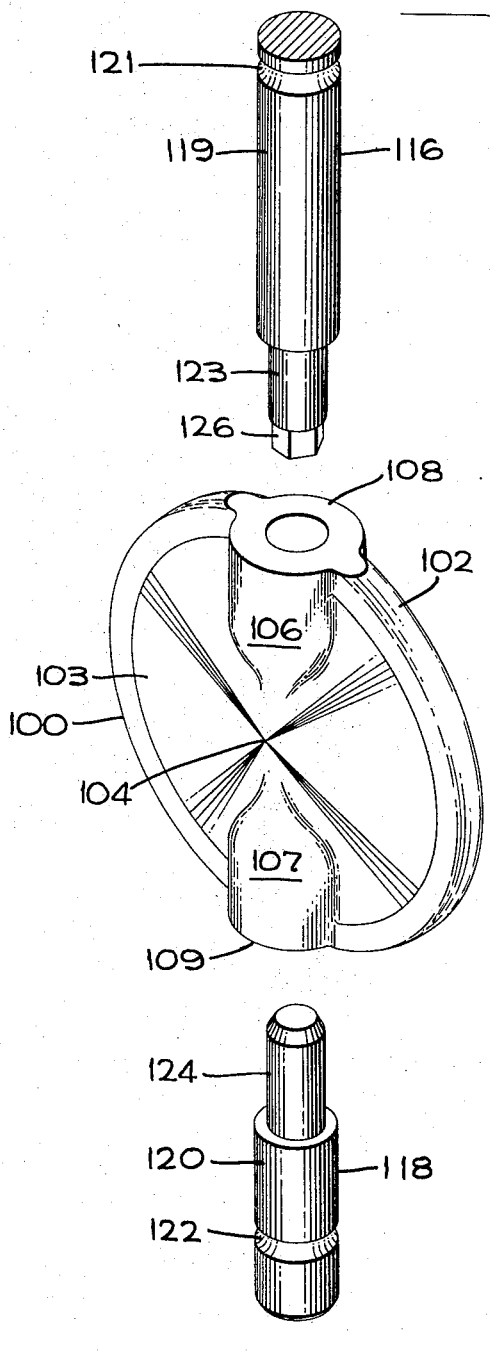

United States Patent Office 3,341,170
Patented Sept. 12, 1967

3,341,170
VALVE
Gordon C. Housworth, Houston, Tex., assignor to FMC Corporation, San Jose, Calif., a corporation of Delaware
Filed Mar. 25, 1964, Ser. No. 354,684
24 Claims. (Cl. 251—306)

The present invention pertains to a valve and more particularly to improvements in a disc or so-called butterfly valve.

The disc valve of the present invention overcomes certain disadvantages of the prior art valve which should be noted. Conventionally, a disc valve includes an annular valve body, an annular seat within the body and a valve disc rotatable within the seat for movement between a closed position with its circumferential edge in sealing engagement with the seat and an open position with portions of this edge spaced from the seat. Frequently, these seats are elastic and are retained in the body by interfitting tongues and grooves or dovetails on the body and the seat. Retention of the seat in this manner is inadequate since the seat is difficult to insert and remove.

Another disadvantage is concerned with the effect of the valve on resistance to flow therethrough and the effect of high velocity and high pressure flow on the valve. Prior art valves have employed discs of irregular contour usually required by extension of a single shaft entirely through the disc whereby the disc causes undue turbulence in the flow. High velocity and/or high pressure flow has also caused such undesirable effects as ballooning of the elastic seat, creeping of the rubber seat under and around the circumferential edge of the disc, and rippling or undulating of the seat.

Certain prior art valves of this type have also had seal deficiencies particularly around the stem where the latter joins disc. Although it has been known to use a disc large enough to compress the elastic seat around the stem and thereby enhance the stem seal, this seal is often inadequate thereby indicating a need for a secondary seal.

Furthermore, it is recognized that even the best seals may wear and leak in time. If leakage does occur, it is important to have a warning or signal of the leakage at the earliest possible moment. A solution to the warning problem is also provided by the present invention.

It is an object of the present invention to provide improvements in a disc valve.

Another object is to provide a disc valve having a seat assembly which is easy to insert and remove.

Another object is to provide a disc valve having a seat assembly that includes an inner elastic seat and a retainer which prevents collapsing of the seat, which avoids ballooning thereof under flow through the valve, and which transmits internal pressure directly to the valve body in order to avoid unnecessary stress on the seat assembly.

Another object is to provide a disc valve with a seat assembly including a seat that does not creep or ripple incident to fluid pressure in the valve.

Another object is to provide a disc valve which minimizes turbulence in the fluid flowing through the valve.

Another object is to provide a disc valve having an improved seal around the stem connected to the disc.

Another object is to provide a disc valve which provides an immediate visual warning when there is leakage past the stem seals.

Another object is to provide a disc valve wherein the disc is mounted for axially adjustable movement in order to balance the pressures on the disc and thereby to insure full circle seating and sealing of the disc with the seat.

These together with other objects and advantages will become apparent upon reference to the following description and accompanying drawings, in which:

FIG. 1 is a plan of a disc valve embodying the present invention and with the disc adjusting handle shown in a closed position.

FIG. 2 is a side elevation of the valve of FIG. 1 with the unlocked position of the handle shown in phantom.

FIG. 3 is an enlarged transverse section taken on a plane indicated by line 3—3 in FIG. 1 but with the handle and disc being shown in open positions.

FIG. 4 is an axial section taken on a plane indicated by line 4—4 in FIG. 3 but with the valve connected between a pair of flange fittings.

FIG. 5 is an axial section taken on a plane indicated by line 5—5 in FIG. 4 but with the disc in closed position.

FIG. 6 is an enlarged fragmentary section taken on a plane indicated by line 6—6 in FIG. 3 and illustrating an alternative construction by dashed lines.

FIG. 7 is an enlarged transverse section taken on line 7—7 in FIG. 2.

FIG. 8 is an enlarged exploded isometric of the seat assembly embodying certain features of the present invention.

FIG. 9 is an enlarged exploded isometric of the valve disc and stems employed in the valve of the present invention.

With particular reference to the drawings (FIGS. 1–5), a disc valve embodying the present invention is identified by the numeral 15 and includes a valve body 16 preferably of metal. The body has an annular shell 18 with an internal cylindrical wall 19 surrounding an axial bore through the body and having annular ends 20.

The valve body 16 (FIGS. 3 and 4) includes an upper neck 25 integral with the shell 18 and projecting upward therefrom and a lower neck 26 integral with the shell and projecting downward therefrom. The upper and lower necks have bores 27 and 28, respectively, therein which are in axial alignment with their common axis transverse to the axis of the axial bore within the wall 19. The upper neck includes a plate 30 radially projecting from the upper transverse bore 27. This plate has an outer arcuate edge 32 (FIG. 1) which extends throughout approximately 270°, lock-close and lock-open notches 34 and 35 at the ends of this edge, and an inner arcuate edge 36 between the notches.

The upper and lower necks 25 and 26 (FIG. 2) also have projecting pairs of tubular bosses 40 and 41 with the openings in each pair of bosses being in alignment and in communication with their respective upper and lower bores 27 and 28 (FIG. 4). In addition, the valve body 16 has a radial rib 44 (FIG. 1) projecting outward from the shell 18 intermediate the ends 20, and this rib has a plurality of notches 45 (FIG. 2) circumferentially spaced there around.

Of considerable importance to the present invention is an assembly 50 shown in FIGS. 3–6, but best illustrated in detail in FIG. 8 to which reference is now directed. The seat assembly includes an annular seat 52 of resiliently compressible and flexible material such as rubber, this seat having an inner surface 53 which is cylindrical throughout substantially its entire circumference. However, the inner surface 53 includes diametrically opposed internal rectangular flats 55 having axial edges 56 and transverse edges 57. The inner surface also includes bevels 59 that extend from the transverse edges to the cylindrical portion of the inner surface. The axial edges of the flats intersect the cylindrical portion of the inner surface. The flats provide axially aligned openings 60 extending radially through the seat.

The seat 52 has an external circumferential surface 65 provided with an outwardly convex intermediate portion 66 which is best seen when viewed in a radial cross-section of the seat, as in FIG. 6. The external surface includes opposite cylindrical end portions 67 and external annular flats 68 individually encircling the openings 60. The seat also has collars 69 projecting outward from the external flats, and ledges 70 are provided within the collars.

In addition, the seat 52 has end flanges 75 which project radially outward from the end portions 67 and provide concentric sealing beads 76. Radial flanges 78 extend outward from the external surface 65 between the end flanges 75 and are in a common plane on diametrically opposite sides of the seat.

The seat assembly 50 includes a split retainer 85, preferably of plastic material in order to avoid corrosion. The retainer includes a pair of substantially semi-cylindrical rigid segments 86 having inner surfaces 87 complementarily fitted (FIG. 6) against the external surface 65 of the seat 52, annular faces 88 in contact with the end flanges 75, and end edges 89 in engagement with their respectively adjacent radial flanges 78. In other words, the radial flanges of the seat project outward between adjacent end edges of the retainer segments. The retainer segments, when assembled, define a substantially cylindrical external surface 90 which, in the relaxed or unstressed condition of the annular seat, has a diameter greater than the diameter of the cylindrical wall 19 of the shell 18. Also, the end surfaces 88 of the assembled segments are spaced closer together than the ends 20 of the shell 18. The segments have inner flats 91 complementarily engaging the outer flats 68 and surrounding openings 92 which receive the collars 69, it being noted that the collars and end flanges 75 of the seat do not project farther out than the external surface 90 of the segments (FIG. 4). The retainer segments are bonded, as at 93, to the seat throughout the entire interface therebetween so that the seat and retainer segments are intimately united in the seat assembly.

In order to insert the seat assembly 50 into the valve body 16, the retainer segments 86 are pressed toward each other thereby to compress the radial flanges 78 between the end edges 89 and slightly to constrict the external surface 65 of the seat. With the seat assembly thus slightly diametrically constricted, the external diameter thereof (and specifically that of surface 90) is less than the diameter of the cylindrical wall 19 whereupon the seat assembly is axially slid into the axial bore, and the openings 60 are aligned with the transverse bores 27 and 28. In this position, the beaded end flanges 75 of the seat 52 project slightly beyond (FIG. 6) the opposite ends 20 of the shell 18. It is of considerable importance to note that when the seat assembly 50 is properly positioned in the shell 18, the seat 52, and particularly the radial flanges 78, is under compression, and the reactive radially outwardly directed force of the seat urges the retainer segments outward against the cylindrical wall 19.

With reference to FIGS. 6 and 8, it will be noted that the external surface 90 of the retainer segments 86 has a plurality of spaced, circumferentially extending grooves 96. These grooves are employed during molding of the seat assembly in order precisely to position each retainer segment in the mold. Secondly, these grooves have another function in an alternative form of the valve. As indicated in dashed lines in FIG. 6, tongues 98 can project from the cylindrical wall 19 into the grooves thereby restricting axial movement of the seat assembly within the shell 18. If this alternative form is employed, however, the shell is made in two semicylindrical halves which are bolted together.

The subject disc valve 15 also includes a valve disc 100 (FIGS. 3, 4, 5 and 9) which has an intermediate surface 102 that is cylindrical throughout substantially its entire circumference, and conical end portions 103 which converge from adjacent to the intermediate surface to apices 104 which are on a common axis and spaced relatively close together. The disc has upper and lower generally cylindrical enlargements 106 and 107 with each enlargement terminating in a flat 108 and 109 respectively. The upper enlargement is provided with an hexagonal socket 111 (FIG. 4), whereas the lower enlargement has a cylindrical socket 112. The distance between the disc flats is greater than the distance between the seat flats 55 so that with the disc fitted in the seat, the disc flats compress the seat flats. Furthermore, with the disc in the seat 52, the upper and lower sockets of the disc are respectively aligned with the upper and lower openings 60 in the seat.

For rotatably mounting the disc 100 in the valve body 16, upper and lower valve stems 116 and 118, FIGS. 3, 4 and 9) are provided. The stems have outer portions 119 and 120 axially slidably fitted in the tranverse bores 27 and 28, and their respective outer portions have annular mounting grooves 121 and 122. These stems also have diametrically reduced inner portions 123 and 124, with the inner portion 124 of the lower stem being cylindrical and axially slidably projecting into the lower socket 112 and with the inner portion 123 of the upper stem having a hexagonal end 126 which is axially slidably received in the hexagonal socket 111 of the disc. Also, the upper stem has an upper annular sealing groove 128 and a square head 130 projecting above the plate 30 on the upper neck 25. Preferably, the stems are coated with Teflon, molybdenum disulphide or the like to provide resistance to corrosion and to facilitate rotation. In order to retain the stems in their respective transverse bores, upper and lower roll pins 132 are mounted in the upper and lower pairs of bosses 40 and 41 and extend through the mounting grooves 121 and 122 of the stems (FIGS. 4 and 7); it is thus evident that the roll pins are substantially tangential to their respective stems so that they preclude axial, but allow rotational, movement of the stems in the transverse bores. The roll pins have another important function to be subsequently described.

It is to be noted that the outer portions 119 and 120 of the stems 116 and 118 project slightly inward (FIG. 4) from the internal wall 19 into the collars 69 of the annular seat 52; the diameters of the outer portions and the collars are such that the collars are in slidably constricting fluid-tight engagement about the stems. Furthermore, the inner portions project through the openings 60 in the seat, and the diameters of the inner portions and the openings are such that the seat flats 55 are compressed about the inner portions of the stems in slidable fluid-tight engagement therewith. Since, as above described, the disc 100 compresses the seat flats, the constriction of the seat about the inner portion of the stem is increased by the presence of the disc in the seat. Primary seals are thus established about the inner portions of the stems by the seat flats.

Another important feature of the present invention is the provision of secondary seals which include O-rings 140 surrounding the inner portions 123 and 124 of the stems 116 and 118 and against the ends of the outer portions 119 and 120. The O-rings 140 are in fluid-tight engagement with both the inner and outer portions of the stems and with the surrounding collars 69. These secondary seals also include the fluid-tight engagement of the collars with the outer portions 119 and 120 of the stems.

An upper tertiary seal is provided by an outer O-ring 141 in the groove 128 of the upper stem 116 and is in fluid-tight engagement with the upper neck 25, primarily to preclude entrance of external contamination into the valve.

The primary and secondary seals described above are very effective, but in the event that leakage does occur after extended periods of use, the subject invention provides for an immediate warning of such leakage. Insofar as the lower primary and secondary seals are concerned, fluid simply leaks out between the lower stem 118 and the lower neck 26 to the atmosphere whereupon it is immediately observed. However, insofar as the upper stem 116 is concerned, no such direct escape to the atmosphere along the axis of the upper stem is possible since the outer O-ring 141 precludes passage of fluid therepast for a considerable time after the upper primary and secondary seals have failed. Accordingly, fluid leaking through the clearance space or leakage path 150 between the upper neck and the outer portion 119 of the upper stem 116 escapes to the atmosphere through the groove 121 and the bore in the upper roll pin 132. It is believed understood that the bore or weep hole in the upper roll pin is in communication with the groove 121 since this upper roll pin is only partially cylindrical and has a longitudinal gap 151 directed toward the groove 121.

The disc valve 15 also includes a handle 160 (FIGS. 1-4) having a square aperture 161 fitted over the square head 130 of the upper stem 116. A washer 162 is received over the projecting square head, and a cap screw 163 is threaded into a tapped hole in the head for retaining the handle on the stem.

The handle 160 has a lower cavity 165 (FIG. 2) extending lengthwise thereof, and a handle grip 166 is positioned within the cavity and mounted on a pin 167 for movement between locking and unlocked positions. The grip has a detent 168 projectable into one or the other of the notches 34 and 35 in the plate 30 when the detent is aligned with such notch and the handle grip is in its locking position. A V-shaped spring 169 is positioned in the cavity and bears against the grip for yieldably urging the same into its locked position. Therefore, with the grip manually held in its unlocked position (phantom lines in FIG. 2), the handle can rotate the valve disc 100 between a fully open position (FIGS. 3 and 4) with the plane of the disc extending lengthwise of the axial bore in the shell 18 and a closed position (FIGS. 2 and 5) with the intermediate surface 102 of the disc in continuous circumferential engagement with the annular seat 52. The disc can be positively held in either its closed or fully open positions by releasing the grip whereupon the detent projects into one of the notches 34 or 35 (full lines in FIG. 2).

The assembly of the valve 15 is briefly reviewed at this point. The inner O-rings 140 are positioned within the collars 69 against the ledges 70, and the seat assembly 50 is diametrically constricted and axially slid into the bore of the shell 18 so that the openings 60 are in alignment with the transverse bores 27 and 28. The valve disc 100 is inserted into the seat assembly with the upper and lower flats 108 and 109 against the seat flats 55 and with the sockets 111 and 112 in alignment with the openings 60 in the seat 52. The lower stem 118 is inserted and is followed by the lower roll pin 132. The outer O-ring 141 is positioned in the groove 128 of the upper stem 116, and this upper stem is inserted into its described position and held there by insertion of the upper roll pin 132. Finally, the handle 160 is attached to the upper stem. Normally, the valve is connected between a pair of flange fittings such as indicated by number 175 (FIGS. 4 and 5). Each of these fittings includes a conduit section 176 and a terminal radial flange 177. The flanges 177 are positioned against the opposite ends 20 of the shell 18, and the flanges are interconnected by bolts 178 fitted in the notches 45 of the rib 44, and nuts 179 are threaded onto the bolts. It is to be noted that with the flanges of the fittings clamping the valve therebetween, the beaded end flanges 75 are compressed into fluid-tight engagement with the flanges 177 so that leakage between the seat assembly and the flanges 177 is precluded.

In use of the subject valve 15, it is assumed that the flange fittings 175 are connected in a fluid line, not shown, so that fluid under pressure is conducted through the conduit sections 176 and the axial bore through the shell 18. It is an important advantage of the subject valve that fluid pressure within the valve is transmitted to the cylindrical wall 19 of the shell so that the shell is the actual pressure container. The reason why this fluid pressure is transmitted to the shell is the diametrically elastic characteristic of the seat assembly 50. As above explained, the seat assembly is held under compression within the shell so that normally, the retainer segments 86 are resiliently pressed against the wall 19 by the seat 52; internal fluid pressure merely increases this outward pressure against the shell. Thus, the valve is stronger and more durable since the shell is better able to contain these pressures than is the seat assembly.

At the same time, however, the retainer holds the seat 52 within the wall 19, maintains the desired generally cylindrical shape of the seat and precludes collapsing thereof, and facilitates insertion and removal of the seat. Furthermore, because of the rigidity of the retainer segments 86 and the bonded attachment thereof to the seat, the latter is prevented from ballooning in any portion thereof under fluid pressure.

The seat assembly 50 has further advantages. The maximum radial dimension of the intermediate convex portion 66 of the seat 52 maintains a desirable amount of seat material around and on opposite sides of the disc 100 when the latter is in closed position so as to minimize creeping of the seat and resultant leakage under high fluid pressure. This maximum intermediate radial thickness is achieved without disturbing the essentially cylindrical internal surface 53 of the seat, it being understood that a cylindrical internal surface is desirable in order to establish full circle seating of the disc, to facilitate opening and closing of the disc and to minimize turbulence in the fluid being conducted. Undulating or rippling of the seat is minimized since the opposite end portions 67 of the seat are of reduced radial thickness. In addition, turbulence control is achieved by utilizing the bevels 59 which smooth out the flow passage around the seat flats 55. Turbulence is also minimized by the valve disc 100. The disc has a streamlined configuration and is of minimum axial dimension between the apices 104 since the stems 116 and 118 do not extend entirely through the disc, as has been common with prior art valves.

Further, since the disc 100 is axially adjustable on the stem, pressure between the engaging disc and seat flats 108, 109 and 55 is equalized so that rotation of the disc between open and closed positions is facilitated and, in the closed position of the disc, its intermediate surface 102 engages the internal surface 53 of the seat 52 with substantially uniform pressure about the entire circumference of the disc, thereby providing full circle seating and sealing.

It will be evident from the foregoing that the subject valve is provided with a seat assembly which is easy to insert and remove, a special advantage when it is desired to replace the seat assembly in the field; which is stronger and more durable since internal fluid pressures are contained by the valve body instead of the seat assembly; which improves the seal between the disc and the seat and around the valve stem; which minimizes turbulence in fluid flowing through the valve; and which provides an immediate visual warning if leakage does occur in the valve. It will be readily appreciated that the valve is ideal for handling dry materials and slurry as well as liquids and gases.

Although a preferred embodiment of the present invention has been shown and described, it will be understood that various changes and modifications may be made in the details thereof without departing from the spirit and the scope of the appended claims.

Having described the invention, what is claimed and desired to be secured by Letters Patent is as follows:

1. In a valve including a valve body having a circumferential internal wall surrounding a flow passage through the body, a continuously annular seat of resiliently compressible material positioned within the wall, a generally annular retainer of separate rigid segments fitted about and bonded to the seat, said body diametrically constricting said retainer and compressing said seat and said retainer being urged by the seat into friction-tight engagement with the wall, a valve disc mounted for rotatable movement within the seat, and means for rotatably moving the disc.

2. In a valve including an annular valve body, a seat assembly fitted within the body and including an annular resiliently compressible seat having a substantially cylindrical inner surface and an outer surface that is convex in a cross section that is taken on a plane that contains the axis of the seat, said seat thereby having opposite end portions which have a radial thickness less than the radial thickness of the intermediate portion of the seat, a disc having an axis of rotation, and means mounting the disc in the seat with its axis of rotation extending through the intermediate portion of the seat and for movement of the disc between a closed position in circumferentially continuous engagement with the inner surface of the seat and an open position with portions of the disc spaced from said inner surface, said assembly including annular retainer means of rigid hard material fitted about substantially the entire circumference of said seat and having an inner concave surface complementarily engaging said convex outer surface.

3. In a valve including a valve body provided with an axial bore, a valve stem mounted within the body and projecting into the axial bore and a valve disc within the axial bore and receiving the valve stem, said disc being movable between open and closed positions for allowing and blocking the flow of fluid through the axial bore, said valve body and stem defining a leakage path therebetween, said leakage path having one end portion communicating with the axial bore, the improvement wherein said stem has a groove communicating with said leakage path and wherein a fluid conducting pin is received in the body and has one end portion in communication with said groove and an opposite end portion communicating with the atmosphere.

4. In the valve of claim 3, wherein said groove is annular and encircles said stem.

5. In the valve of claim 3 wherein said stem is axially slidably fitted within the valve body and wherein said pin projects into said groove and precludes axial movement of the stem.

6. In the valve of claim 5 wherein said groove is annular and concentric with the stem and wherein said pin accommodates rotatable movement of the stem relative to the body.

7. In a valve including a valve body having a bore therein, an annular elastic seat positioned in the bore, means between the seat and the body for retaining the seat in the bore and for transmitting the force caused by expansive efforts of the seat to the body, a valve disc within the seat, and means for rotating the disc between open and closed positions, said retaining means including a plurality of rigid arcuate segments complementarily fitted against the outer surface of the seat, said segments having opposite ends with the adjacent ends of adjacent segments being in spaced relation to each other, said segments being thereby in cylinder-forming relation and being radially movable to increase or decrease the size of the cylinder formed thereby, said seat having radial flanges projecting between said adjacent segments, said flanges being resiliently compressed between said adjacent ends.

8. In a valve including a valve body having a bore therein, an annular elastic seat positioned in the bore, means between the seat and the body for retaining the seat in the bore and for transmitting the force caused by expansive efforts of the seat to the body, a valve disc within the seat, means for rotating the disc between open and closed positions, said retaining means including a plurality of rigid arcuate segments complementarily fitted against the outer surface of the seat, said segments having opposite ends with the adjacent ends of adjacent segments being in spaced relation to each other, said segments being thereby in cylinder-forming relation and being radially movable to increase or decrease the size of the cylinder formed thereby, and interfitting means on the valve body and the retaining segments for precluding axial slidable movement of the segments when they are positioned within the bore.

9. In a valve including a valve body provided with a bore, a resiliently compressible seat positioned within the bore and having an opening therein, a valve stem received in the body and projecting through the opening, a disc positioned in the seat and having a socket receiving the stem, said disc compressing the seat into fluid-tight engagement around the stem to establish a primary seal, and an O-ring encircling said stem on the opposite side of the seat from the disc and being in fluid-tight engagement with the stem and the seat to establish a secondary seal, said seat having a collar projecting outward in surrounding relation to said stem, and said O-ring being within said collar and in fluid-tight engagement with said collar as well as said stem.

10. The valve of claim 9 wherein said stem includes an outer portion of predetermined diameter and an inner portion of a diameter smaller than said predetermined diameter, said inner portion projecting through said opening, said O-ring encircling said inner portion of the stem and against the end of the outer portion, and wherein said seat has a collar projecting outward around and in fluid-tight engagement with said O-ring and the outer portion of the stem.

11. In a valve including a valve body having a circumferential internal wall surrounding a flow passage; a diametrically resiliently expandable and contractible unitary seat assembly within said wall and including seat means of resiliently compressible and expandable material extending about the passage and seat retaining means of rigid material attached to the seat means for maintaining said seat means in a substantially predetermined geometric shape whereby fluid pressure in the flow passage is transmitted to and directed against the wall by the seat means and the seat retaining means, said seat retaining means extending substantially the entire circumference of the seat means, said seat retaining means being radially split and thereby providing a pair of closely adjacent, confronting and axially extending end edges movable toward and away from each other when the seat assembly contracts and expands respectively, said seat retaining means having a width dimension extending axially of the seat means, said seat retaining means being unyielding to forces tending to axially compress or expand said seat retaining means; and flow control means within the seat means.

12. The valve of claim 11 wherein said seat means and seat retaining means are unitarily axially slidable into and out of said wall.

13. In the valve of claim 11 wherein said seat means has a substantially annular outwardly directed surface every point of which is in contact with said seat retaining means.

14. The valve of claim 11 wherein said flow control means is pivotable about an axis extending through said seat assembly, and wherein said seat assembly is diametrically expandable and contractible as a result of forces applied along said axis and diametrically unexpandable and uncontractible as a result of forces applied normal to said axis.

15. In a valve including a valve body having a circumferential internal wall surrounding a flow passage; a diametrically resiliently expandable and contractible unitary seat assembly within said wall and including seat means of resiliently compressible and expandable material extending about the passage and seat retaining means of rigid material attached to the seat means for maintaining said seat means in a substantially predetermined geometric shape whereby fluid pressure in the flow passage is transmitted to and directed against the wall by the seat means and the seat retaining means, said seat retaining means including a plurality of rigid arcuate segments of hard material, each segment extending along an arc of the seat means, each segment having a pair of opposite end edges, and adjacent end edges of adjacent segments being in closely adjacent confronting relation to each other; and flow control means within the seat means.

16. In a valve including a valve body having a bore therein; a unitary seat assembly including an annular elastic seat positioned in the bore and retaining means associated with the seat for transmitting to the body the radially outward directed force caused by expansive efforts of the seat resulting from fluid pressure in the bore and for maintaining the seat in generally a predetermined shape, said seat assembly being slidable axially of the bore into and out of the bore, said retaining means including a plurality of rigid arcuate segments complementarily associated with the seat in cylinder-forming relation, said segments having opposite ends with the adjacent ends of adjacent segments being in adjacent closely spaced relation to each other and being thereby radially movable to increase or decrease the size of the cylinder formed thereby; a valve disc within the seat; and means for moving the disc between open and closed positions.

17. The valve of claim 16 wherein there are two of said segments, each such segments extending over slightly less than 180° of the circumference of the seat.

18. The valve of claim 16 wherein said seat is rubber, said retaining segments are of rigid hard plastic, and wherein said segments are bonded to said seat.

19. A unitized seat assembly for a butterfly valve, comprising a continuously generally annular seat of resiliently compressible material having an inner surface defining a flow passage and an outer surface spaced radially outward from said inner surface; and a generally annular retainer including a plurality of separate rigid arcuate segments fitted about and bonded to the outer surface of the seat, said segments having opposite sides and opposite ends with the adjacent ends of adjacent segments being in spaced relation to each other, said segments being thereby in cylinder-forming relation and being radially movable to increase or decrease the diameter of the cylinder formed thereby.

20. The seat assembly of claim 19 wherein said seat has radial flanges projecting between adjacent segments.

21. The seat assembly of claim 19 wherein said seat has annular end sealing flanges extending radially outward from said flow passage along the opposite sides of the segments.

22. The seat assembly of claim 21 wherein the end sealing flanges are beaded.

23. The seat assembly of claim 19 wherein said inner surface and said outer surface both have a pair of diametrically opposed flat portions, said outer surface flat portions being positioned radially outward from and substantially parallel to said inner surface flat portions to define flat areas in said seat of generally uniform thickness.

24. The seat assembly of claim 23 wherein said segments have flat portions complementarily engaging the outer surface flat portions of said seat.

References Cited

UNITED STATES PATENTS

| | | | |
|---|---|---|---|
| 2,054,396 | 9/1936 | Francis | 251—307 |
| 2,912,218 | 11/1959 | Stillwagon | 251—306 |
| 3,048,363 | 8/1962 | Garrigan | 251—307 |
| 3,079,123 | 2/1963 | Freemantle | 251—306 |
| 3,095,177 | 6/1963 | Muller | 251—306 X |
| 3,153,427 | 10/1964 | Burtis | 251—173 X |
| 3,192,945 | 7/1965 | Blakeley | 251—308 X |
| 3,233,861 | 2/1966 | Stillwagon | 251—306 X |

FOREIGN PATENTS

| | | |
|---|---|---|
| 680,536 | 5/1961 | Canada. |

M. CARY NELSON, *Primary Examiner.*

R. C. MILLER, *Assistant Examiner.*

Disclaimer 3,341,170.—*Gorden C. Housworth,* Houston, Tex. VALVE. Patent dated Sept. 12, 1967. Disclaimer filed Nov. 12, 1969, by the assignee, *FMC Corporation.*

Hereby enters this disclaimer to claims 3, 4, 5 and 6 of said patent.

[*Official Gazette February 10, 1970.*]